UNITED STATES PATENT OFFICE.

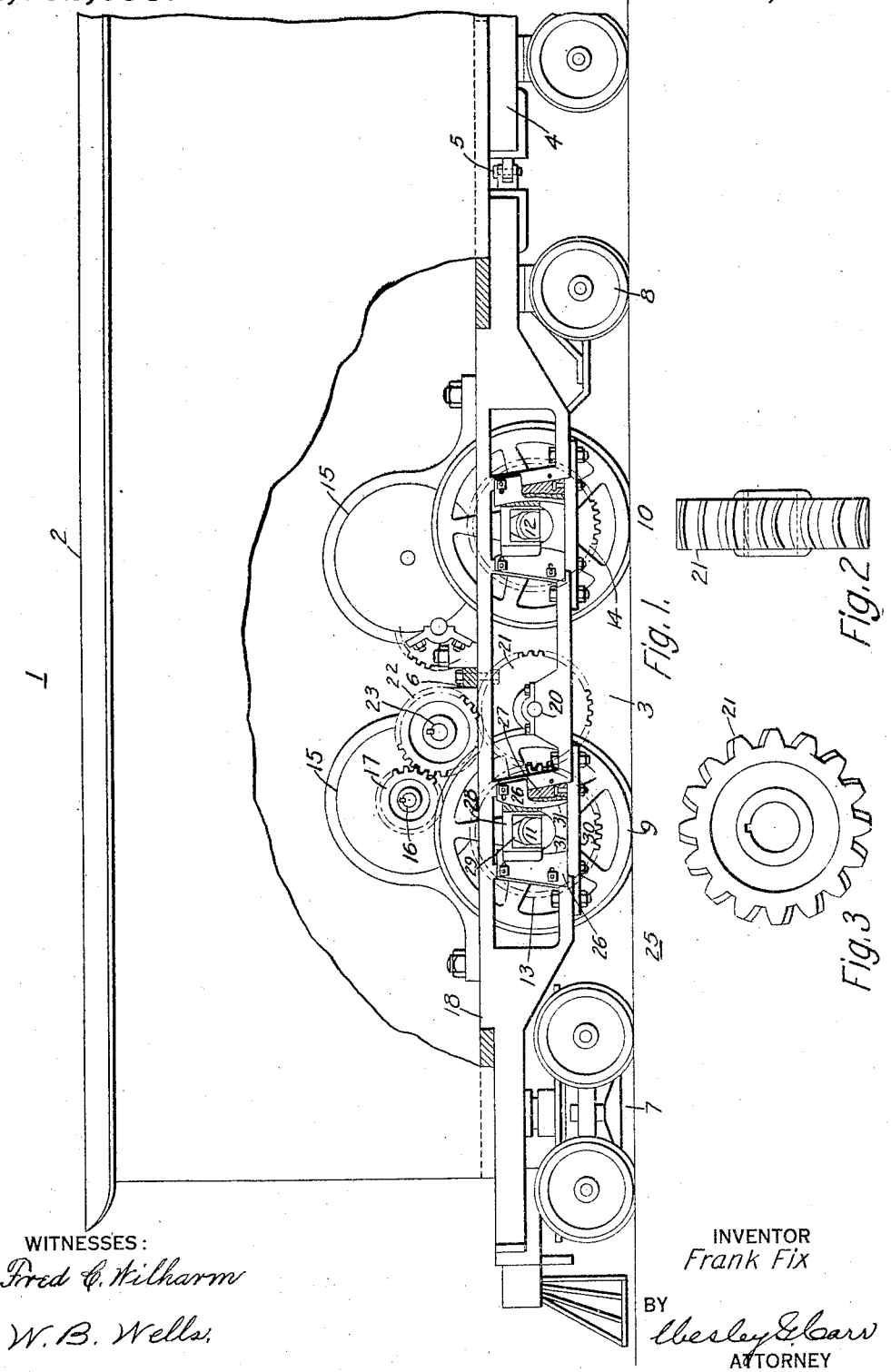

FRANK FIX, OF IRWIN, PENNSYLVANIA, ASSIGNOR TO WESTINGHOUSE ELECTRIC & MANUFACTURING COMPANY, A CORPORATION OF PENNSYLVANIA.

LOCOMOTIVE.

1,382,898.  Specification of Letters Patent.  Patented June 28, 1921.

Application filed January 5, 1917. Serial No. 140,739.

*To all whom it may concern:*

Be it known that I, FRANK FIX, a citizen of the United States, and a resident of Irwin, in the county of Allegheny and State of Pennsylvania, have invented a new and useful Improvement in Locomotives, of which the following is a specification.

My invention relates to locomotives and particularly to electric locomotives provided with systems of gear wheels between the propelling motors and the driving wheels thereof.

One object of my invention is to provide a locomotive which shall have a system of rigidly-mounted gear wheels for transmitting the driving effort of the motors to the propelling wheels and means whereby the locomotive side frames may have movement relative to the driving wheels and maintain the meshing of the various gear wheels.

Another object of my invention is to provide a locomotive which shall have a portion of the gear wheels of the gearing system between the propelling motors and the driving wheels rigidly mounted on the driving axles and a portion thereof rigidly mounted on the side frames, and means whereby the driving axles may have movement relative to the side frames and maintain the meshing of the various gear wheels.

A further object of my invention is to provide a locomotive of the above-indicated character which shall have the teeth of the transmitting gear wheels curved with respect to lines parallel to the gear wheel axes and cylindrical guides for the driving axle journal boxes, whereby the driving axles and the side frames may have movement relative to each other without impairing the meshing of the various gear wheels which are disposed between the propelling motors and the driving wheels.

In electric locomotives, it is very desirable to have the propelling motors mounted on the side frames and thus relieve the driving axles, as much as possible, from all unnecessary weights rigidly connected thereto. Trouble is experienced, however, when the motors are mounted on the side frames, in transmitting the driving effort of the motors to the driving wheels. The various irregularities in the road bed and in the track cause a constant relative movement between the driving axles and the side frames which tends to impair any driving connection disposed between the propelling motors and the driving axles.

In locomotives now in service where the propelling motors are mounted on the side frames independent of the driving-wheel axles, it is necessary to provide a flexible connection between the motors and the driving wheels which will allow for all relative movement between the driving axles and the side frames. In case a system of gearing is provided between the propelling motors and the driving wheels, a flexible gear wheel or a flexible drive is inserted in the gearing system to prevent the breaking of the various gear-wheel teeth and to insure a correct meshing of the various gear wheels when the driving axles and the side frames have movement relative to each other.

However, in a locomotive constructed in accordance with my invention, a system or train of rigidly-mounted constantly enmeshed gear wheels is provided with means whereby the driving axle and the side frames may have movement relative to each other without interfering with the meshing of the various gear wheels.

In the accompanying drawing, Figure 1 is a side elevational view of a portion of a locomotive constructed in accordance with my invention; and Figs. 2 and 3 are detail views of one of the gear wheels in the transmitting system between one of the propelling motors and a driving axle.

Referring to the drawing, a locomotive 1 embodies a cab 2 and two articulated running gears 3 and 4 which are connected together by a pivotal connection 5 and are pivotally connected to the cab 2 by pivotal connections 6, one only of which is illustrated. Each of the running gears embodies a four-wheel pivotal outer truck 7, a two-wheel radial inner truck 8, and two pairs of driving wheels 9 and 10 which are disposed between the two auxiliary trucks 7 and 8. The driving wheels 9 and 10 are provided with driving axles 11 and 12 which have gear wheels 13 and 14 respectively mounted thereon.

A propelling motor 15, having an armature 16 and a pinion 17 mounted thereon, is disposed on side frames 18 substantially above each of the driving axles 11 and 12. The gearing system between the driving shaft 11 and the propelling motor 15 associated therewith is similar to the gearing system between the driving axle 12 and the propelling motor 15 associated therewith, but the two gearing systems are preferably disposed on opposite sides of the locomotive, as is illustrated in Fig. 1 of the drawing. A jack shaft 20, which is mounted on the side frames 18, is provided with a gear wheel 21 which meshes with the gear wheel 13 mounted on the driving axle 11 and with a gear wheel 22 which is mounted on a shaft 23. The gear wheel 22 also meshes with the motor pinion 17. Each of the gear wheels in the transmitting systems between the propelling motors 15 and the driving axles 11 and 12 is provided with teeth which are curved with respect to lines parallel to their axes, as is illustrated by the gear wheel 21 in Figs. 2 and 3. The constructing of the gear wheels with teeth that are curved with respect to lines parallel to their axes insures a correct meshing of the teeth with various gear wheels, when the driving axles effect a movement relative to the side frames or when these axles assume a non-parallel position with respect to the fixed gear shafts and motor shaft.

The bearings for the driving shafts 11 and 12 are similar in construction and, accordingly, only bearing 25 for the driving axle 11 will be described in detail. The driving-axle bearing 25 embodies two pedestal gibs 26 which are adjusted to the side frames 18 by means of wedges 27, a bearing box 28 which is guided in its vertical movement by the gibs 26, and a bearing brass 29 which is interposed between the driving shaft 11 and the bearing box 28.

The bearing box 28 and the pedestal gibs 26 are provided with co-acting cylindrical surfaces which have centers in the axis of the gear wheel 21. Thus, any vertical movement of the driving axle 11, relative to the side frames 18, will cause the gear wheel 13 to effect a movement of rotation about the gear wheel 21 and maintain the gear wheels 13 and 21 in mesh.

The jack shaft 20, the shaft 23 and the armature shaft 16, in each of the gearing systems, are provided with sufficient end play, whereby the teeth on the various gear wheels adjust themselves longitudinally with respect to the gear wheels mounted on the driving axles and insure a more perfect meshing of the gear wheels at all times.

Variations in the structure and arrangement and location of parts may be made without departing from the spirit and scope of my invention, and such modifications are intended to be covered by the appended claims.

I claim as my invention:

1. In a motor operated vehicle, the combination with a driving axle provided with a gear wheel rigidly mounted adjacent one end thereof, of side frames provided with gear wheels rigidly mounted thereon and in mesh with said first mentioned gear, means for permitting the axle to oscillate in a vertical plane, and means for permitting movement of said axle with respect to said frame about the axis of the gear mounted on said frame as a center.

2. In a motor operated vehicle, the combination with a driving axle provided with a gear wheel rigidly mounted thereon, of side frames provided with gear wheels rigidly mounted thereon and in mesh with said first mentioned gear, and means for permitting movement of said axle about the axis of the gear mounted on said frame and for permitting rotation of one of said gears with respect to the other about an axis passing through the central portion of the axis of each of the gears and through their point of contact.

3. In a locomotive, the combination with driving axles, side frames associated with said axles and propelling motors mounted on said side frames, of rigidly-mounted gear wheels for transmitting the driving effort of the motors to said axles, said gear wheels having teeth curved with respect to lines parallel to the gear wheel axes and disposed in equitant relation to each other for permitting relative movement between said axles and the side frames.

4. In a locomotive, the combination with an axle, and side frames and driving wheels mounted on said axle, of a gear wheel rigidly mounted on said axle, and a gear wheel rigidly mounted on said side frames and meshing with said first-mentioned gear wheel, the teeth of said gear wheels being curved with respect to lines parallel to the gear wheel axes and disposed in equitant relation to each other to permit relative movement between said axle and said side frames.

5. In a locomotive, the combination with an axle having driving wheels mounted thereon, side frames and axle bearings for supporting the side frames on said axle, of a gear wheel rigidly mounted on said axle adjacent one end thereof, a gear wheel rigidly mounted on said side frames and constantly meshing with said first-mentioned gear wheel, the teeth of said gear wheels being curved to permit of relative rotative movement in a transverse plane, and bearing guides for permitting said axle and said axle bearing to move in a vertical plane relative to said side frames and serving to maintain said gear wheels in mesh with each other.

6. In a locomotive, the combination with a plurality of driving axles, side frames associated with said driving axles, and propelling motors mounted on said side frames, of rigidly-mounted gear wheels for transmitting the driving effort of said motors to the driving axles, the teeth of said gear wheels being curved with respect to lines parallel to the gear-wheel axes and being disposed in equitant relation to each other to permit said axles to effect a limited movement of rotation relative to said side frames, and driving-axle bearings having guides provided with cylindrical surfaces to permit further movement of said axles relative to said side frames.

7. In a locomotive, the combination with a driving axle, side frames associated with said driving axle, and two meshing gear wheels rigidly mounted on said axle and said side frames, of means for permitting said axle to effect a limited movement of rotation in a vertical plane about the gear wheel mounted on said side frames, and means for permitting said axle to effect a further movement relative to the gear wheel mounted on said side frames.

8. In a locomotive, the combination with a driving axle, side frames associated with said driving axle, and two meshing gear wheels rigidly mounted on said axle and on said side frames, at a point adjacent one end of the driving axle, of means for permitting said axle to effect a limited movement of rotation in a vertical plane about the gear wheel mounted on said side frames, and means for permitting the axle to oscillate in a vertical plane.

9. In a locomotive, the combination with an axle, a pair of driving wheels and side frames mounted on said axle, and a motor mounted on said side frames and connected to said axle by a train of constantly enmeshed gear wheels, one of said gear wheels being rigidly mounted on said axle and the remaining gear wheels being mounted on the side frames, and the teeth of said gear wheels being curved with respect to lines parallel to the gear wheel axes and being disposed in equitant relation to each other, whereby said axle and said side frames may have relative movement as to each other without disengaging the teeth on the various gear wheels.

In testimony whereof, I have hereunto subscribed my name this 30th day of Dec., 1916.

FRANK FIX.